United States Patent
Smith et al.

(10) Patent No.: US 7,430,356 B2
(45) Date of Patent: Sep. 30, 2008

(54) FABRICATION OF OPTICAL WAVEGUIDES IN PERIODICALLY POLED LITHIUM NIOBATE

(75) Inventors: Peter George Robin Smith, Southhampton (GB); Corin Barry Edmund Gawith, Southhampton (GB); Lu Ming, Southhampton (GB)

(73) Assignee: University of Southampton, Southampton, Hampshire (GB)

( * ) Notice: Subject to any disclaimer, the term of this patent is extended or adjusted under 35 U.S.C. 154(b) by 97 days.

(21) Appl. No.: 10/595,991

(22) PCT Filed: Nov. 16, 2004

(86) PCT No.: PCT/GB2004/004806

§ 371 (c)(1),
(2), (4) Date: May 24, 2006

(87) PCT Pub. No.: WO2005/052682

PCT Pub. Date: Jun. 9, 2005

(65) Prior Publication Data

US 2007/0092194 A1   Apr. 26, 2007

(30) Foreign Application Priority Data

Nov. 24, 2003  (GB) .................. 0327267.1
Mar. 8, 2004   (GB) .................. 0405177.7

(51) Int. Cl.
  *G02B 6/10* (2006.01)
  *G02B 6/34* (2006.01)

(52) U.S. Cl. .......................... 385/132; 385/37
(58) Field of Classification Search ......... 385/129–132, 385/4, 14, 122; 372/22

See application file for complete search history.

(56) References Cited

U.S. PATENT DOCUMENTS

| | | | | |
|---|---|---|---|---|
| 5,249,191 A | * | 9/1993 | Sawaki et al. | 372/22 |
| 5,249,250 A | * | 9/1993 | Yamada et al. | 385/122 |
| 5,875,053 A | * | 2/1999 | Webjorn et al. | 359/326 |
| 7,155,102 B2 | * | 12/2006 | Pruneri et al. | 385/129 |

OTHER PUBLICATIONS

Suhara, T. et al. "Waveguide Quasi-Phase-Matched Sum-Frequency Generation Device for High-Efficiency Optical Sampling", IEEE Photon. Technol. Lett. 11 No. 8 Aug. 1999 1027-1029.

Chou, M. H. et al. "1.5-μm-Band Wavelength Conversion Based on Cascaded Second-Order Nonlinearity in Waveguides", IEEE Photon. Technol. Lett. 11 No. 6 Jun. 1999 653-655.

(Continued)

*Primary Examiner*—Quyen Leung
(74) *Attorney, Agent, or Firm*—Renner, Otto, Boisselle & Sklar, LLP.

(57) ABSTRACT

A method of fabricating an optical waveguide (18) comprises providing a sample of lithium niobate (10) that has one or more periodically poled gratings made by electric field poling, applying a patterned surface layer of metallic zinc (16) to a z-face of the sample so that the layer (16) has a pattern corresponding to an intended pattern of waveguides (18) to be written int lithium niobate, and heating the sample to diffuse the metallic zinc (16) into the lithium niobate so as to form an optical waveguiding structure (18) within the sample.

13 Claims, 3 Drawing Sheets

OTHER PUBLICATIONS

Kanbara, H. et al. "All-Optical Switching Based on Cascading of Second-Order Nonlinearities in a Periodically Poled Titanium-Diffused Lithium Niobate Waveguide", IEEE Photon. Technol. Lett. 11 No. 3 Mar. 1999 328-330.

Parameswaran, K. R. et al. "Low-Power All-Optical Gate Based on Sum Frequency Mixing in APE Waveguides in PPLN", IEEE Proton. Technol. Lett. vol. 12, No. 6, Jun. 2000, pp. 654-656.

Di Lallo, Annarita et al. "Second harmonic generation in reverse proton exchanged Lithium Niobate waveguides ", Feb. 12, 2001 vol. 8, No. 2. Optic Letter Express 232-237.

Bortz, M. L. et al. "Depth profiling of the d33 nonlinear coefficient in annealed proton exchanged LiNbO3 waveguides, "App. Phys. Lett., 62, pp. 2012-2014, Apr. 1993.

Amin, J. et al. "Blue light generation in a periodically poled Ti: Lithium Niobate channel waveguide", Optics Communications 135 (1997) 41-44, Feb. 1997.

Schreiber, G. et al. "Efficient Cascaded Difference Frequency Conversion in Periodically Poled Ti: Lithium Niobate Waveguides using Pulsed and CW Pumping", Appl. Phys. B73,501-504 (2001), (no month).

Young, W. M. et al. "Fabrication, Characterization, and Index Profile Modeling of High-Damage Resistance Zn-Diffused Waveguide in Congruent and MgO: Lithium Niobate", Lightwave Technol. 10, 1238, (Sep. 1992) vol. 10, No. 9, pp. 1238-1246.

Twu, Ruey-Ching et al. "Zn Indiffusion Waveguide Polarizer on Y-cut LiNbO3 at 1.32-μm Wavelength", IEEE Photonics Technology Letters, vol. 12, No. 2, Feb. 2000. pp. 161-163.

Suhara, T. et al. "Fabrication Zn: Lithium Niobate Waveguides by Diffusing ZnO in Low Pressure Atmosphere", Jpn. J. Appl. Phys. 39 (2000) L864-L865, Aug. 2000.

Herreros, B. et al. "Optical Waveguides by Zn diffusion from Vapor Phase", Appl. Phys. Lett. 66 (12), Mar. 20, 1995 pp. 1449-1451.

Nevado, Ruben et al. "Preservation of Periodically Poled Structures in Zn-Diffused Lithium Niobate Waveguides", Jpn. J. Appl. Phys. vol. 39 (2000) pp. L488-L489, Part 2, No. 6A, Jun. 2000.

Domenech, M. et al. "Blue Light by SGH in Diode Pumped LiNbO3 Waveguides", Physica Status Sol. 192 No. 1 (Mar. 15, 2002): 135-138.

Cantelar, E. et al. "Second-harmonic generation in Zn-diffused periodically poled LiNbO3 channel waveguides" Appl. Phys B 73, 515-517 (2001).

Barry, Ian E. et al. "Microstructuring of lithium niobate using differential etch-rate between inverted and non-inverted ferroelectric domains" Materials Letters 37 (1998) 246-254.

Shigematsu, Yasuaki et al. "Fabrication of LiNbO3 TE/TM Waveguides for 1.5 μm Wavelength Band by Zn/Ni Diffusion in Low-Pressure Atmosphere" Jpn. J. Appl. Phys. vol. 41 (2002) 4825-4827.

Yang, Chunhui et al. "Studies of photorefractive crystals of double-doped Ce, Fe:LiNbO3" Optics Communications 175 (2000) 247-252.

M. Fujimura, H. Ishizuki, T. Suhara, H. Nishihara; "Quasi-Phasematched Wavelength Conversion in Zn-Diffused LiNbO$_3$ Waveguides"; Dept of Electron. Eng., Grad. School Eng., Osaka Univ. (no date).

Lu Ming, Corin B.E. Gawith, Katia Gallo, Martin V. O'Connor, Gregory D. Emmerson, Peter G. R. Smith; "High Conversion Efficiency Single-Pass Second Harmonic Generation in Zinc-Diffused Periodically Poled Lithium Niobate Waveguide": vol. 13, No. 13 Jun. 27, 2005 Optics Express.

* cited by examiner

FABRICATION OF OPTICAL WAVEGUIDES IN PERIODICALLY POLED LITHIUM NIOBATE

This application is a national phase of International Application No. PCT/GB2004/004806 filed Nov. 16, 2004 and published in the English language.

BACKGROUND OF THE INVENTION

The present invention relates to the fabrication of optical waveguiding structures in lithium niobate.

Quasi-phase-matched (QPM) wavelength conversion devices based on lithium niobate waveguides have been widely studied for many years. The main applications of this technology include telecommunication systems, nonlinear optics, and blue laser sources for next generation DVDs [1, 2, 3]. QPM utilises periodic inversion, or poling, of the domain structure of lithium niobate to enhance the phase-matching capability of the material. The poled structure is commonly referred to as a grating. Lithium niobate poled in this way is known as periodically poled lithium niobate (PPLN). Several methods are now widely used for fabricating waveguides in this material, the most popular of which are annealed-proton exchange (APE) [4, 5, 6], titanium diffusion, and ion implantation. However, each of these developed techniques has some limits of applicability [7].

The fabrication of waveguides on PPLN substrates generally involves two steps in a sequence that depends on the choice of waveguide formation technology. For example, proton exchange involves firstly poling the lithium niobate ($LiNbO_3$) with a certain period of grating and then forming a channel waveguide, whereas titanium diffusion reverses this order. APE waveguides are formed at relatively low temperatures (350° C.-400° C.) [5, 6], so normally the waveguides are fabricated after the lithium niobate sample has been poled. Poling after the waveguide formation results in a poor periodic grating structure. APE waveguides show increased resistance to photorefractive damage, but support only extraordinary guided modes [5]. In addition, proton exchanged layers decrease the nonlinear coefficient of the lithium niobate in the initial proton exchange layer [6], requiring complex post annealing to recover the nonlinearity. An alternative low temperature technique, ion implantation, requires the use of ion accelerators and so is complex and expensive.

The normal temperature for titanium diffusion into $LiNbO_3$ is around 1050° C. to 1100° C. [7]. This process is used to fabricate titanium-diffused $LiNbO_3$ waveguides to be used in conventional (non-QPM) optical components, such as optical modulators, which demonstrate good electro-optic properties, low propagation losses, and support both TE and TM guided modes [7]. However, the diffusion process is not compatible with periodically poled materials, because at such high temperatures the periodically switched domain structure is degraded. The alternative sequence process of poling after the formation of waveguides has been used with some success, but the formation of an unwanted thin domain inverted layer during the high temperature process for titanium diffusion may cause problems in the subsequent poling. An additional weakness of this technique is the worsened photorefractive damage in $LiNbO_3$ induced by the incorporation of $Ti^{4+}$ ions, which limits the operation of the $Ti:LiNbO_3$-based devices to the infrared and visible range of the spectrum [7, 8]. Several methods for suppressing out-diffusion have been proposed, for example surface polishing off the 50 nm out-diffused layer after thermal processing [8], but those steps add complexity to the technique. In addition, it is very difficult to provide a uniform PPLN structure through a titanium in-diffused waveguide due to the electrical insulating properties of the lithium out-diffused layer in the waveguide area [7, 8].

To overcome such difficulties, low temperature diffusion (below 1000° C.) is desirable, requiring the use of elements with a high diffusion coefficient and a low activation energy. In this case, zinc appears to be suitable. The formation of low loss optical waveguides in $LiNbO_3$ by zinc diffusion from ZnO surface films has been demonstrated [9, 11]. There is also a report on the fabrication of zinc-diffused waveguides in y-cut $LiNbO_3$ for 1.32 μm wavelength operation by diffusion of surface metallic zinc [10]. Zinc-diffused waveguides in PPLN substrates grown by the Czochralshi method (where the PPLN domains are formed into the $LiNbO_3$ crystal as it is grown) have also been reported, made by zinc diffusion from the vapour phase at low temperatures [12, 13]. Czochralshi-grown PPLN is limited in terms of quality and commercial viability, however. None of these techniques are well-developed.

SUMMARY OF THE INVENTION

Accordingly, a first aspect of the present invention is directed to a method of fabricating an optical waveguide comprising: providing a sample of lithium niobate having one or more gratings of periodic domain inversion defined therein by electric field poling; applying a layer of metallic zinc to a z-face of the sample, the layer having a pattern corresponding to a desired pattern of optical waveguide; and heating the sample to cause the zinc to diffuse into, and hence alter the refractive index of, the lithium niobate so as to form an optical waveguiding structure within the lithium niobate.

Thus, a technique is proposed in which diffusion of surface deposited metallic zinc is used to create waveguides in previously electric field-poled material. Zinc diffusion occurs at a lower temperature than titanium diffusion (930° C. rather than 1050° C.), which allows existing periodically poled structures and the principal nonlinear coefficient of lithium niobate, $d_{33}$, to be completely preserved during diffusion. This is a huge advantage as electric field poling can be performed in virgin lithium niobate wafers using pre-optimised parameters for a high grating yield, and with no diffusion-related issues of material modification or deterioration. The ability to introduce waveguides into already poled PPLN samples allows the poling yield to be optimised before the waveguide fabrication takes place. This is important as any changes to the surface of the material caused by the diffusion, such as the incorporation of zinc or out-diffusion of lithium, can drastically change the poling characteristics later on, so that poling after diffusion can be problematic. A further benefit of the technique is that the metallic patterns necessary for the zinc diffusion into the lithium niobate can be precisely defined on top of the existing PPLN gratings, to give waveguides perfectly aligned with the gratings, and therefore maximum device efficiency. Typical waveguide widths are 10 μm or less, so that this high level of alignment is particularly beneficial. Hence, when the two techniques of poling narrow gratings, which can give the best grating quality, and zinc diffusion are combined, an excellent route towards high-yield device fabrication is provided.

High quality optical structures can be obtained using the method. These have many advantages. For example, a high resistance has been found to photorefractive damage, to which lithium niobate is particularly vulnerable. Consequently, the zinc-based waveguides are expected to allow efficient operation at room temperature and operation at blue/visible wavelengths, both of which are unattainable in devices fabricated by the existing techniques of titanium diffusion or proton exchange. Also, zinc-diffused waveguides support both TE and TM modes, a result which is unattainable via proton exchange. Further, the production efficiency of the technique can be high. The diffusion time for zinc diffusion into lithium niobate is far shorter than that for titanium diffusion or for annealed proton exchange [6,7], so that high volume production efficiency will increase accordingly.

Optionally, the method may further comprise defining the one or more gratings in the sample of lithium niobate by performing electric field poling of the sample. This is an alternative to using existing poled material, and can increase the flexibility of the process by allowing a user to control production from the initial virgin wafer through to the finished product, to obtain any desired structure.

For example, performing the electric field poling may include applying an electric field across the sample via gel electrodes applied to the +z and −z faces of the sample. While any electric field poling technique can be used, a gel electrode-based approach has been shown to give gratings that respond very well to subsequent zinc diffusion.

Also, the method may further comprise applying a film of metallic nickel to the z-face of the sample before applying the layer of metallic zinc, to improve adhesion of the zinc to the lithium niobate. This improves the quality of the patterning of the zinc layer, so that the waveguiding structure may be more accurately defined and positioned.

Heating the sample may comprise heating the sample to a diffusion temperature at which the zinc diffuses into the lithium niobate, maintaining the sample at the diffusion temperature for a preselected length of time, and cooling the sample from the diffusion temperature, in which the heating and cooling are performed at a rate of substantially 6° C. per minute. This rate has been found to give good results, while the diffusion temperature and length of time (diffusion time) can be selected to control the amount and extent of diffusion, and hence control the parameters of the waveguide.

The method is not limited to pure lithium niobate. The lithium niobate may contain a dopant material. Dopants can be selected to modify material properties of the lithium niobate, such as refractive index and susceptibility to photorefractive damage. For example, the dopant material may comprise one or more of iron, magnesium and cerium.

BRIEF DESCRIPTION OF THE DRAWINGS

For a better understanding of the invention and to show how the same may be carried into effect reference is now made by way of example to the accompanying drawings in which:

FIG. 5 shows a graph of the variation of output beam spot size and numerical aperture with distance to an imaging CCD camera for a beam transmitted through;

DETAILED DESCRIPTION

In order to create a standardised route towards creating high-quality zinc-diffused waveguides in electric-field-poled PPLN crystals, two distinct fabrication routes can be considered. A first approach is based on the assumption that it is possible to periodically pole the lithium niobate crystals after the zinc indiffusion process. This approach is analogous to that used in the technique of titanium diffusion in lithium niobate.

Therefore, attempts were made to periodically-pole high-temperature zinc-diffused $LiNbO_3$. However, these attempts were judged to be unsuccessful owing to the presence of a thin $Li_2O$ out-diffusion induced domain-inverted layer on the +z face of the crystal, which blocks subsequent electric field poling. This is similar to the case for poling titanium-diffused $LiNbO_3$.

Figure 1A:
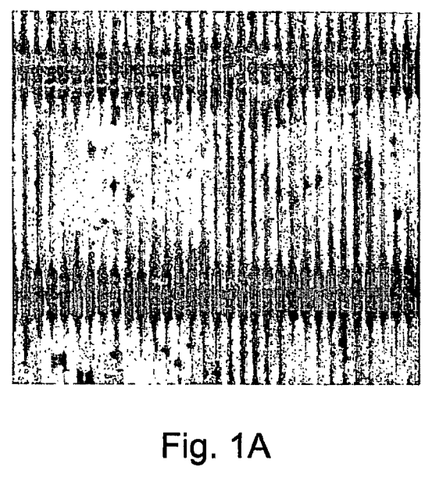
FIGS. 1A and 1B show microscope images of a sample of lithium niobate that has been poled by electric field poling after indiffusion of zinc.
Figure 1B:
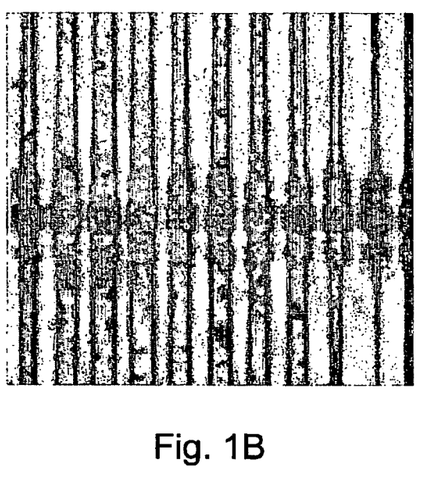
Figure 2A:
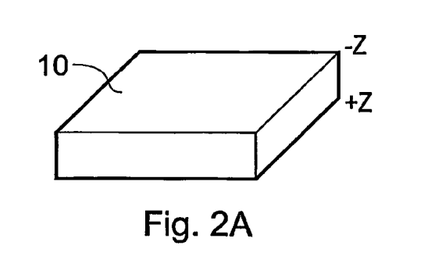
FIGS. 2A to 2D show schematic representations of a sample of lithium niobate to which steps in an embodiment of the method of the present invention are applied.
Figure 2B:
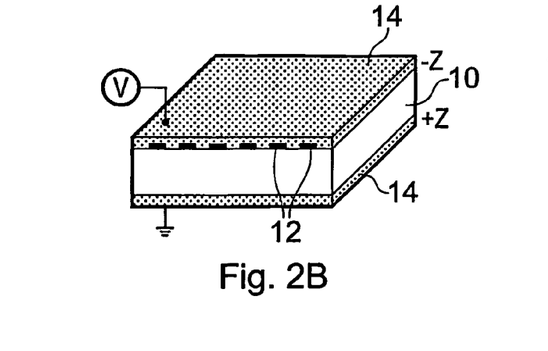
Figure 2C:
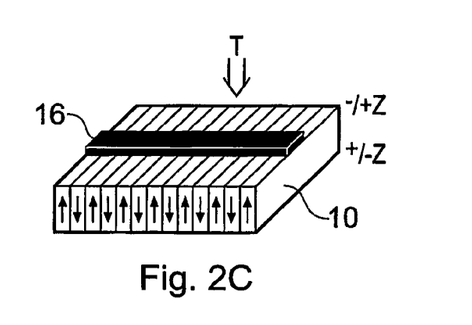
Figure 2D:
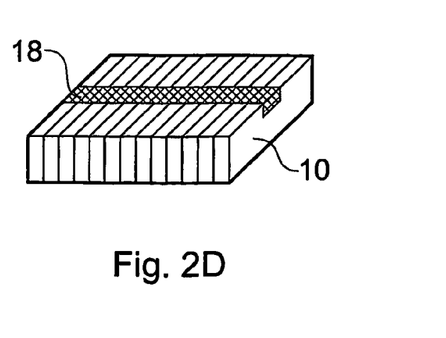

FIGS. 1A and 1B show microscope images (at different magnifications) of an example result of poling a previously zinc-diffused $LiNbO_3$ sample. The domain structure of the poled sample was revealed by wet etching with diluted $HF:HNO_3$ solution (1:2 by volume) at room temperature. The period of the poling is 10 μm and the width of the waveguide is 6 μm. From these images it can be seen that the zinc-diffused area is under-poled while the remaining area is over-poled; hence the grating in the waveguide area is poor. This suggests that poling after diffusion does not give good quality results.

Accordingly, a method of fabricating zinc-diffused waveguides in PPLN which involves poling the sample first, and fabricating the waveguide afterwards is considered as an alternative. This approach has given highly successful results, and allows high-yield high-quality reduced photorefractive damage devices to be fabricated using a completely new process. Various fabrication conditions have been investigated and optimised to obtain waveguides for different wavelengths shown to be good quality through characterisation of mode profiles, numerical aperture (NA), spot sizes and other parameters.

FIG. 2 shows a series of schematic representations illustrating various steps in the method. FIG. 2A shows a sample 10 of lithium niobate which has been z-cut, which is to say that it is oriented with its +z and −z faces available for poling and diffusion. FIG. 2B shows the sample 10 prepared for electric field poling. An array of insulating photoresist stripes 12 are patterned onto the −z face to define the periodic spacing of the poled grating. Electrodes 14, which may be gel electrodes, for example, are applied to both the −z and +z faces, and an electric field applied across the sample. The applied field defines the grating by causing domain inversion, giving the desired grating structure. This is depicted in FIG. 2C, in which the sample 10 is shown with an array of alternately oriented domains, as indicted by the arrows. FIG. 2C also shows the sample 10 prepared for zinc indiffusion. A layer 16 of metallic zinc is applied or deposited onto a z-face of the sample 10; either the +z or the −z face may be used. The layer is patterned in the form of a stripe in this example; this defines a pattern that corresponds to a desired shape for the eventual waveguide. In this case, the intended waveguide structure is a channel waveguide extending perpendicular to the grating domains. The sample 10 is then heated (represented by the symbol T) to a temperature high enough for zinc diffusion. The zinc diffuses from the surface layer 16 into the sample 10, where it alters the refractive index, so as to define an optical waveguiding structure 18. FIG. 2D shows this end result, where the channel waveguide 18 is represented by dark shading.

The method as depicted in FIG. 2 is merely an example. Any electric field poling technique may be employed to fabricate the PPLN sample. However, the combination of insulating photoresist and gel electrodes has been found to give good results in combination with the zinc indiffusion.

Also, it is not necessary to perform the electric field poling as part of the method. Instead, previously poled material, for example obtained from a supplier of nonlinear crystals, can be provided as a sample into which a waveguiding structure is written or defined by zinc diffusion.

Further, any technique suitable for depositing and patterning the zinc layer may be used; the choice will depend in part on the suitability for defining a pattern of the shape and dimensions that match the desired waveguiding structure. Within the limits of the technique selected, any waveguiding structure can be fabricated using the present invention. This offers great flexibility and the ability to create a wide range of optical devices. Samples with a number of gratings can be used, for example a plurality of identical gratings or a selection of gratings with different periods. Waveguiding structures can then be fabricated in any or all of the gratings, by depositing an appropriate pattern of zinc. This approach may be used to fabricate complex optical structures, or to make a multiplicity of individual devices (to be cut from the sample) with a single deposition and diffusion process. For a given grating, the waveguiding structure may comprise a single waveguide, several separate waveguides, or a network of connected waveguides, for example. A particular waveguide may extend through one or more gratings. Careful patterning of the zinc allows the waveguides to be precisely aligned with the gratings, for maximum efficiency of optical interactions. Alternatively or additionally, waveguides may be written in parts of the sample that do not contain gratings, since although the whole sample is heated up, the temperature required for the diffusion does not affect the grating structure. In summary, within the limits of patterning the zinc layer and poling the gratings, any pattern of waveguides can be created in a lithium niobate wafer already having any poled structure.

The method is applicable to lithium niobate in general. Both near-stoichiometric and congruent crystals could be used, but in the near-stoichiometric case the poled gratings may not survive if the composition is too close to stoichiometry, and thus experimental confirmation of suitability will be needed before using our zinc diffusion in any given near-stoichiometric material. In either case, the lithium niobate can be doped with one or more dopant materials if desired or if such material is conveniently available. Dopants can be used to reduce susceptibility to photorefractive damage, to modify the refractive index, or to promote laser or amplifier activity, for example. Suitable dopants include iron, magnesium and cerium.

Examples of the method of the present invention will now be described.

In one example, a sample of z-cut 500 µm thick congruent $LiNbO_3$ was first cleaned in an ultrasonic bath at a temperature of 50° C. Then a thin layer of photoresist (S1813) was spin-coated onto the −z face of the sample, upon which periodic patterns with periods Λ of 6.50 µm and 10 µm were defined using a Karl Suss MA4 mask aligner.

The photoresist was then developed to leave an array of insulating stripes, and gel electrodes were applied to both z surfaces of the sample at room temperature. After this, the sample was poled by using the electrodes to apply an electric field across the sample, using a computer-controlled high electric field supply device that dynamically varied the applied field in order to maintain a designated current curve. The poling process was terminated when a predefined charge Q had passed through the sample, where $Q=2AP_s$; A is the area through which the electric field is applied; and $P_s$ is the spontaneous polarisation of the sample material. For $LiNbO_3$, $P_s=0.72$ µC/mm². The applied electric field was around 22.4 kV/mm, which is an appropriate value to cause domain reversal in $LiNbO_3$. The time duration of the poling is proportional to the calculated charge value, which depends on the area to be poled.

After poling, the sample was inspected under a microscope using crossed polarisers in order to check the quality of the PPLN. It should be noted that an additional consideration advantageous to the method is that of producing or using high-quality periodically poled structures in lithium niobate crystals. During experiments into the mechanics and optimisation of periodically poled materials, the inventors have discovered that the highest quality and highest yield PPLN gratings can be achieved when very thin periodic patterns are applied. For example, it is far simpler to fabricate a 'perfect' 10 µm-wide PPLN grating over a distance of centimetres than it is to create a 1 mm-wide grating over the same distance. This effect is likely due to avoiding as many defect sites in the crystal as possible. The effect also applies to the achievable periods in the sample, as the increased quality of thinner gratings allows finer periods of less than 10 µm to be readily achieved. This is more difficult in wider gratings. In the case of fabricating channel waveguides in PPLN for high-efficiency second-harmonic-generation, it is often the case that such short period gratings are required. By using the present invention, waveguides can be successfully written into or defined in these good quality yet narrow gratings, because the surface zinc layer can be applied in precise and well-defined patterns that are accurately aligned with the gratings. Thus, the combination of steps of the method allows high quality poled waveguides to be fabricated.

After poling, the lithium niobate sample was thoroughly cleaned to remove any surface particulates that could cause contamination and influence the thermal diffusion process. To prepare the sample for zinc diffusion, zinc strips defining a desired pattern and shape of channel waveguides spaced 100 µm apart with widths varying from 1.0 µm to 7 µm and oriented parallel to the x-direction of the sample were patterned on the sample surface by photolithography. The −z face of the sample was used in this example. It is known that zinc atoms adhere poorly to the surface of $LiNbO_3$ [10], so to address this a 5-10 nm thick nickel film was deposited onto the −z face of the PPLN substrate prior to depositing the zinc layer, in order to increase adhesion of the zinc. This step may be omitted, however. Once the nickel was applied, the zinc film was evaporated onto the sample using a standard lift-off technique. Further samples were poled and patterned in the same way, with thicknesses of zinc varying from 80 nm to 150 nm.

Then, the samples were placed into a covered platinum crucible in a high-temperature oven, to undergo a thermal in-diffusion cycle. In this example, the cycle involved heating the samples at a rate of 6° C./min to diffusion temperature, maintaining that temperature for certain time, then cooling back down to the room temperature at rate of 6° C./min. All the in-diffusion processing was carried out in dry air.

Table 1 below lists the different samples (by number in the left hand column), together with the thickness of the zinc layer, and the diffusion time and temperature used for each sample:

| No | Time (min) | Zinc thickness (nm) | Diffusion Temp (° C.) | NA-Y | NA-Z | Spot size-y (um) | Spot size-z (um) |
|---|---|---|---|---|---|---|---|
| 1 | 80 | 80 | 930 | 0.079 | 0.105 | 4.09 | 3.26 |
| 2 | 120 | 80 | 930 | 0.074 | 0.094 | 4.74 | 3.51 |
| 3 | 150 | 80 | 930 | 0.064 | 0.082 | 6.34 | 3.71 |
| 4 | 180 | 80 | 930 | 0.050 | 0.080 | 6.87 | 3.96 |
| 5 | 80 | 80 | 900 | 0.093 | 0.104 | 4.34 | 3.11 |
| 6 | 120 | 100 | 930 | 0.080 | 0.109 | 4.43 | 3.23 |
| 7 | 120 | 120 | 930 | 0.089 | 0.115 | 3.81 | 3.14 |
| 8 | 120 | 150 | 930 | 0.090 | 0.120 | 3.49 | 3.06 |

Figure 3A:
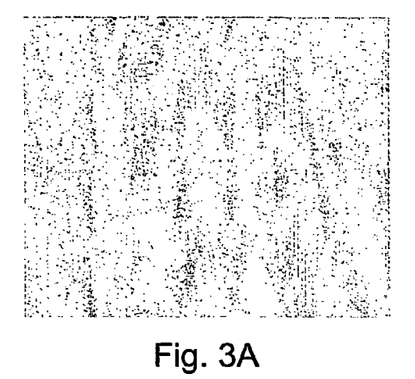
FIGS. 3A and 3B show microscope images of a sample of electrically poled lithium niobate before and after formation of a zinc-diffused waveguide using an embodiment of the invention.
Figure 3B:
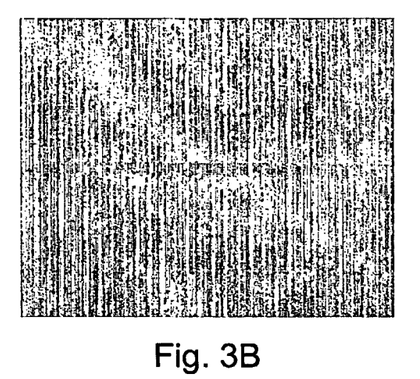

In order to make sure that the gratings were still present after these high temperature treatments, sample No. 2 was etched in a solution of HF:HNO$_3$ (1:2) for ten minutes so that the structure could be viewed under a microscope. FIG. 3A shows a microscope image of sample No. 2 after poling but before the thermal zinc diffusion of the waveguide, and FIG. 3B shows a microscope image of the sample after diffusion to create a 6 µm wide zinc-diffused region in a 10 µm period grating and subsequent wet etching. Comparison of these images shows that the uniformity of the grating is preserved over the entire length of the poled sample after the diffusion. This result confirms that the periodically inverted domain structure of the PPLN substrate maintains its original form during the diffusion process. Problems of random fluctuations in domain wall position, such as occur during titanium diffusion of poled samples, are overcome.

After waveguide fabrication, the end faces of the samples were cut and polished to allow optical characterisation. The final device length was approximately 12 mm. Characterisation of the zinc-diffused channel waveguides was carried out using a He—Ne laser (λ=632.8 nm) fibre-butt coupled into the channel waveguides. A 10× lens was used to focus the waveguide output beams onto a CCD camera mounted on a translation stage. This allowed the camera to be moved along the beam propagation direction so that the near and far field modes could be recorded. The camera was linked to a computer which allowed measurements to be of made parameters including beam spot size, mode profile and numerical aperture (NA) of the waveguides.

Figure 4:
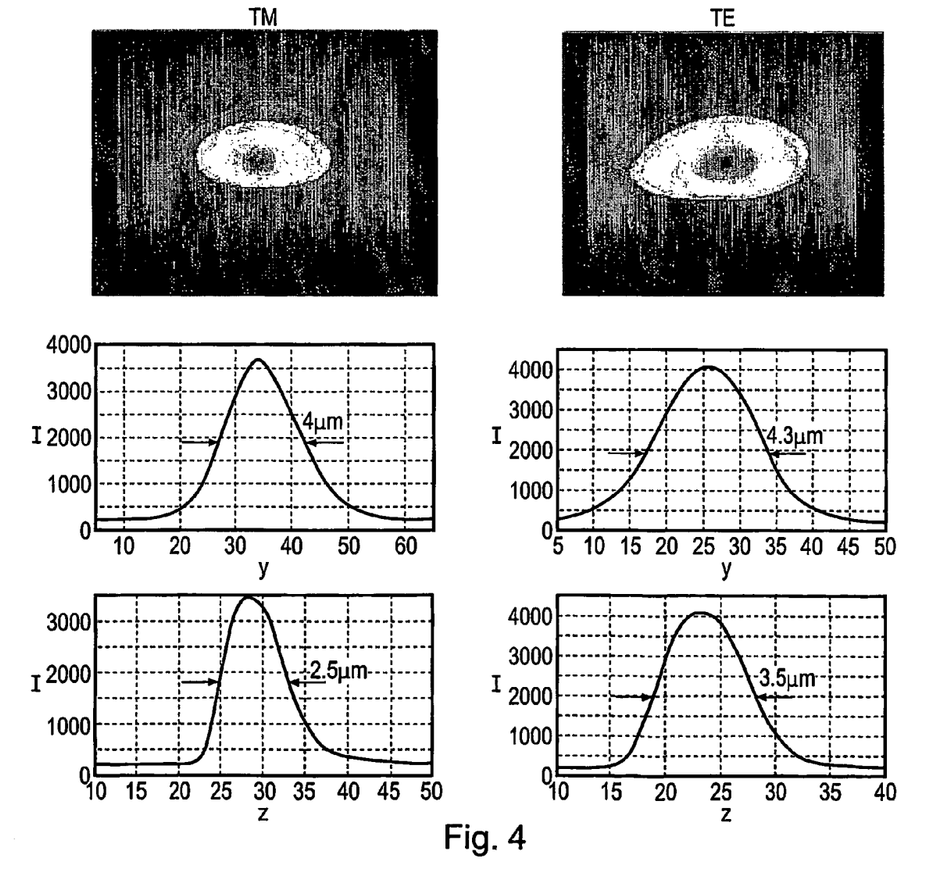
FIG. 4 shows measurements of TE and TM mode output beams transmitted through a zinc-diffused waveguide formed using an embodiment of the invention, as images of the beam spot and profiles of the beam intensity.

FIG. 4 shows measurements of the TE and TM mode profiles for channel waveguides in sample No. 2, in which the width of the metal deposited for diffusion was 2.0 µm. The upper images are camera images of the beam spot, with the TM mode on the left and the TE mode on the right. The graphs under the camera images are the corresponding profiles of the intensity I across the beam in the horizontal or y (upper graphs) and vertical or z (lower graphs) directions. It can be seen that both modes are single mode at the 633 nm wavelength, with a full width at half maximum (FWHM) mode size of 4 µm in the y direction and 2.5 µm in the z direction for the TM mode, and 4.3 µm in the y direction and 3.5 µm in the z direction for the TE mode. Thus, the zinc-diffused waveguide supports both TM and TE modes.

Figure 5:
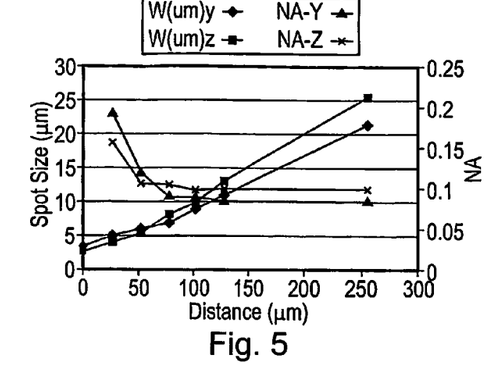

FIG. 5 shows a graph of the results of adopting the far-field technique to determine the numerical aperture (NA) the waveguide of sample No. 2. The graph shows measurements of the dependence of the spot size W in the y and z directions on the distance of the CCD camera to the focusing point of the beam. The numerical aperture is calculated from these measurements and also plotted on the graph. Larger distances lead to larger spots, which give a better estimate of the NA. When the distance D is very much greater than the core size of the waveguide, the NA tends to be a constant figure, which, as shown, is 0.08 in the y direction and 0.11 in the z direction.

Based on the NA obtained in this way, the refractive index change Δn of the waveguide of sample No. 2 has been calculated to be around 0.0015 in the y direction and 0.0025 in the z direction, achieved under the diffusion conditions listed in Table 1.

Figure 6:
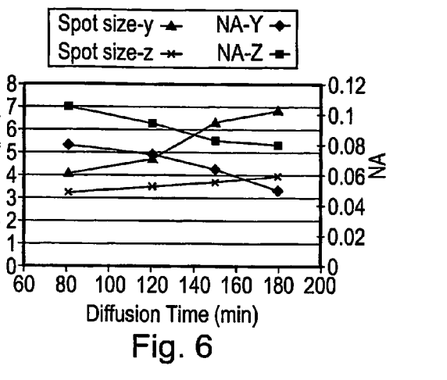
FIG. 6 shows a graph of the variation of output beam spot size and numerical aperture with diffusion time for zinc-diffused waveguides formed using an embodiment of the invention.

Similar measurements were made on the other samples, the results of which are listed in Table 1. FIG. 6 shows a graph of the dependence of the FWHM spot size and the NA as a function of the diffusion time, varied from 80 min to 180 min as shown in Table 1. In all cases, the thickness of the patterned zinc layer was 80 nm and the diffusion temperature was 930° C. The longer the diffusion time, the bigger the spot size and the smaller the NA obtained. It is observed that the spot size change in the z direction is smaller than it is in the y direction.

Figure 7:
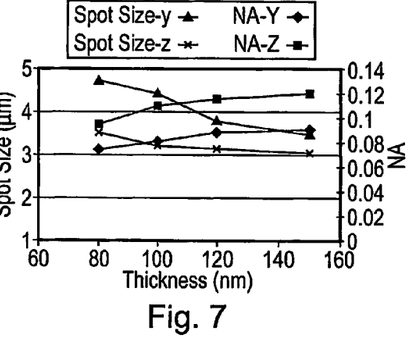
FIG. 7 shows a graph of the variation of output beam spot size and numerical aperture with thickness of deposited zinc layer for zinc-diffused waveguides formed using an embodiment of the invention.

FIG. 7 shows a graph of the dependence of the FWHM spot size and the NA on the thickness of the zinc layer, varied from 80 nm to 150 nm as shown in Table 1. In all cases, the diffusion temperature was 930° C. and the diffusion time was 120 min. FIG. 7 indicates that a thicker zinc film results in a smaller spot size and a larger NA. Thus, the thicker the zinc film, the smaller the mode spot size and the better the confinement of the waveguide, hence giving a higher power intensity within the waveguide. However, the thicker zinc films resulted in a rougher sample surface due to the zinc remnant after the thermal indiffusion processing. This was probably caused by Zn—LiNbO$_3$ reaction in the air, and gives a higher propagation loss owing to the scattering of light in the waveguide surface. It was also found that for a zinc film of 150 nm thickness, the remnant was far more rough than for a 120 nm film.

Figure 8:
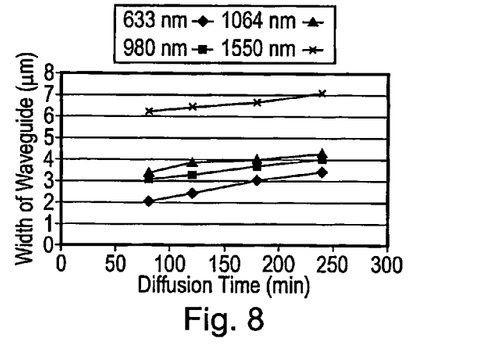
FIG. 8 shows a graph of the variation of waveguide width with diffusion time for a range of zinc-diffused waveguides for transmission of different wavelengths formed using an embodiment of the invention.

FIG. 8 shows a graph of the dependence of the width of single mode channel waveguides for different wavelengths on the diffusion time, at a diffusion temperature of 930° C. with a zinc layer thickness of 120 nm.

From FIGS. 5 to 8, it can be seen that the fabrication of channel waveguides for different wavelengths requires different diffusion conditions. The thickness and width of the deposited zinc layer, the diffusion temperature and the diffusion time can be selected to control the characteristics of the waveguide. Samples with thicker zinc layers diffused for a shorter time are favourable for the fabrication of single mode channel waveguides with strong confinement and small spot size. Thinner zinc layers and longer diffusion times are suitable for single mode channel waveguides with smaller NA and bigger spot size. The trade-off of diffusion conditions for fabrication of single mode channel waveguides for wavelengths of 980 nm, 1064 nm and 1550 nm are listed in Table 2 below:

| Wavelength (nm) | Thickness of Zinc layer (nm) | Diffusion Time (min) | Diffusion Temperature (° C.) | Deposited Zinc strip width (um) |
|---|---|---|---|---|
| 980 | 80 | 80 | 930 | 3.2 |
| 1064 | 80 | 120 | 930 | 3.6 |
| 1550 | 120 | 120 | 930 | 6.4 |

Figure 9:
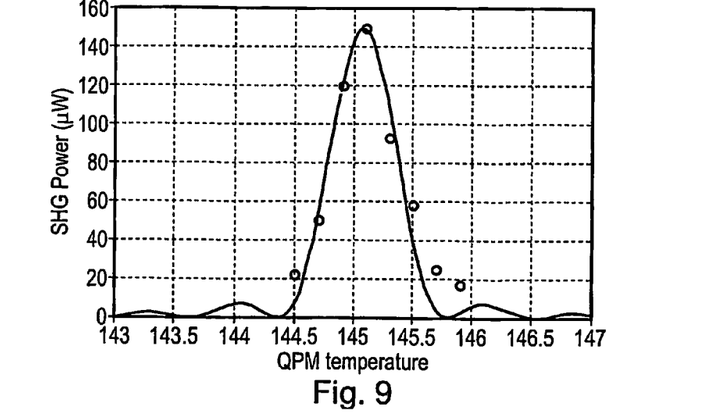
FIG. 9 shows a graph of the results of an experiment to measure quasi-phase matched second harmonic generation in a zinc-diffused waveguide formed using an embodiment of the invention.

Second harmonic generation (SHG) of the output of a Nd:YAG laser at 1064 nm was then used to study the uniformity of the periodically switched domain structure inside the zinc waveguide after the thermal diffusion. High quality domain gratings are required for quasi-phase matched (SHG) in waveguides. A TM polarised incident beam was used to take advantage of the optimal non-linear susceptibility tensor coefficient of lithium niobate, the $d_{33}$ coefficient. An end-polished waveguide sample with a 6.5 μm grating period and a zinc waveguide of width 3.6 μm (obtained using the diffusion conditions listed in Table 2) was put in a temperature-tunable oven. The SHG output beam was focused into an optical power meter, and the power of the SHG green light (532 nm) was measured at different temperatures. FIG. 9 shows the results, as a plot of the variation of SHG output power with temperature. Measured data points are compared with a calculated theoretical curve. As can be seen, the QPM temperature is around 145.1° C. The maximum output external SHG power of 150 μW was recorded for a internal pump power of 30 mW of fundamental beam, which corresponds to a conversion efficiency of 16.7%/Wcm$^2$, with a waveguide length of 10 mm.

The SHG measurement was carried out for 3 hours and no photorefractive damage or SHG output power fluctuations were found. This indicates that the influence of the photorefractive effect induced by generation of the second harmonic beam is depressed by the zinc diffused waveguide, compared to what would be expected for standard PPLN waveguides, such as those fabricated by proton exchange or titanium diffusion. This is highly significant, as PPLN typically suffers from photorefractive damage to the extent that usable wavelengths and powers are often limited.

These various experimental results demonstrate the advantages and usefulness of the present invention. It provides a straightforward way of fabricating waveguides in periodically poled lithium niobate, for which there are many applications. There is flexibility in the individual steps of the method, so that these may be performed in the most convenient, efficient and appropriate manner for the desired end product. Waveguides of excellent quality and fine structure may be achieved.

REFERENCES

[1] T. Suhara, H. Ishizuki, M. Fujiinura and H. Nishihara, "Waveguide Quasi-Phase-Matched Sum-Frequency Generation Device for High-Efficiency Optical Sampling", IEEE Photon. Technol. Lett. 11 No 8 August (1999) 1027.

[2] M. H. Chou, I. Brener, M. M. Fejer, E. E. Chanban and S. B. Christman, "1.5-μm-Band Wavelength Conversion Based on Cascaded Second-Order Nonlinearity in LiNbO$_3$ Waveguides", IEEE Photon. Technol. Lett. 11 No. 6 June (1999) 653.

[3] H. Kanbara, H. Itoh, M. Asobe, K. Noguchi, H. Miyazawa, T. Yanagawa and I. Yokoyama, "All-Optical Switching Based on Cascading of Second-Order Nonlinearities in a Periodically Poled Titanium-Diffused Lithium Niobate Waveguide", IEEE Photon. Technol. Lett. 11 No. 3 March (1999) 328.

[4] K. R. Parameswaran, M. Fujimura, M. H. Chou, and M. M. Fejer, "Low-Power All-Optical Gate Based on Sum Frequency Mixing in APE Waveguides in PPLN", IEEE Photon. Technol. Lett. Vol. 12, No. 6, June (2000).

[5] Annarita Di Lallo, Alfonso Cino, Claudio Conti and Gaetano Assanto, "Second harmonic generation in reverse proton exchanged Lithium Niobate waveguides", 12 Feb. (2001) Vol. 8, No. 2. Optic Letter Express 232.

[6] M. L. Bortz, L. A. Eyres, and M. M. Fejer, "Depth profiling of the d33 nonlinear coefficient in annealed proton exchanged LiNbO$_3$ waveguides," App. Phys. Lett., 62, pp. 2012-2014 (1993).

[7] J. Amin, V. Pruneri, J. Webjorn I, P. St. J. Russell, D. C. Hanna, J. S. Wilkinson, "Blue light generation in a periodically poled Ti: Lithium Niobate channel waveguide", Optics Communications 135 (1997) 41-44.

[8] G. Schreiber, H. Suche, Y. L. Lee, et al, "Efficient Cascaded Difference Frequency Conversion in Periodically Poled Ti: Lithium Niobate Waveguides using Pulsed and CW Pumping", Appl. Phys. B73, 501-504(2001).

[9] W. M. Young, M. M. Fejer, M. J. F. Digonnet, A. F. Marshall, and R. S. Feigelson, J. "Fabrication, Characterization and Index Profile Modeling of High-Damage Resistance Zn-Diffused Waveguide in Congruent and MgO: Lithium Niobate", Lightwave Technol. 10, 1238, (1992).

[10] Ruey-Ching Twu, Chia-Chih Huang, and Way-See Wang, "Zn Indiffusion Waveguide Polarizer on Y-cut LiNbO$_3$ at 1.32-um Wavelength", IEEE Photonics Technology Letters, Vol. 12, No. 2, February (2000).

[11] T. Suhara, T. Fujieda, M. Fujimura and H. Nishihara, "Fabrication Zn: Lithium Niobate Waveguides by Diffusing ZnO in Low Pressure Atmosphere", Jpn. J. Appl. Phys. 39 (2000) L864.

[12] B. Herreros and G. Lifante, "LiNbO$_3$ Optical Waveguides by Zn diffusion from Vapor Phase", Appl. Phys. Lett. 66(12), 20 Mar. (1995).

[13] Ruben Nevado, Eugenio Cantelar, Gines Lifante and Fernando Cusso, "Preservation of Periodically Poled Structures in Zn-Diffused Lithium Niobate Waveguides", Jpn. J. Appl. Phys. Vol. 39 (2000) pp. L488-L489, Part 2, No. 6A, June 2000.

The invention claimed is:
1. A method of fabricating an optical waveguide comprising:
providing a sample of lithium niobate having one or more gratings of periodic domain inversion defined therein by electric field poling;

applying a layer of metallic zinc to a z-face of the sample, the layer having a pattern corresponding to a desired pattern of optical waveguide; and heating the sample to cause the zinc to diffuse into, and hence alter the refractive index of, the lithium niobate so as to form an optical waveguiding structure within the lithium niobate.

2. A method according to claim 1, and further comprising defining the one or more gratings in the sample of lithium niobate by performing electric field poling of the sample.

3. A method according to claim 2, in which performing the electric field poling includes applying an electric field across the sample via gel electrodes applied to the +z and −z faces of the sample.

4. A method according to claim 1, and further comprising applying a film of metallic nickel to the z-face of the sample before applying the layer of metallic zinc, to improve adhesion of the zinc to the lithium niobate.

5. A method according to claim 1, in which heating the sample comprises heating the sample to a diffusion temperature at which the zinc diffuses into the lithium niobate, maintaining the sample at the diffusion temperature for a preselected length of time, and cooling the sample from the diffusion temperature, in which the heating and cooling are performed at a rate of substantially 6° C. per minute.

6. A method according to claim 1, in which the lithium niobate contains a dopant material.

7. A method according to claim 6, in which the dopant material comprises one or more of iron, magnesium and cerium.

8. A method according to claim 2, and further comprising applying a film of metallic nickel to the z-face of the sample before applying the layer of metallic zinc, to improve adhesion of the zinc to the lithium niobate.

9. A method according to claim 3, and further comprising applying a film of metallic nickel to the z-face of the sample before applying the layer of metallic zinc, to improve adhesion of the zinc to the lithium niobate.

10. A method according to claim 2, in which heating the sample comprises heating the sample to a diffusion temperature at which the zinc diffuses into the lithium niobate, maintaining the sample at the diffusion temperature for a preselected length of time, and cooling the sample from the diffusion temperature, in which the heating and cooling are performed at a rate of substantially 6° C. per minute.

11. A method according to claim 3, in which heating the sample comprises heating the sample to a diffusion temperature at which the zinc diffuses into the lithium niobate, maintaining the sample at the diffusion temperature for a preselected length of time, and cooling the sample from the diffusion temperature, in which the heating and cooling are performed at a rate of substantially 6° C. per minute.

12. A method according to claim 2, in which the lithium niobate contains a dopant material.

13. A method according to claim 3, in which the lithium niobate contains a dopant material.

* * * * *